US012693984B2

(12) United States Patent
Han et al.

(10) Patent No.: US 12,693,984 B2
(45) Date of Patent: Jul. 28, 2026

(54) MASTER-SLAVE SWITCHING INTERFACE STRUCTURE OF SERVER, AND APPLICATION APPARATUS THEREOF

(71) Applicant: SUZHOU METABRAIN INTELLIGENT TECHNOLOGY CO., LTD., Suzhou (CN)

(72) Inventors: Dafeng Han, Suzhou (CN); Tiejun Liu, Suzhou (CN); Jing Ji, Suzhou (CN)

(73) Assignee: SUZHOU METABRAIN INTELLIGENT TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 19/167,829

(22) PCT Filed: Sep. 29, 2024

(86) PCT No.: PCT/CN2024/122308
§ 371 (c)(1),
(2) Date: Sep. 22, 2025

(87) PCT Pub. No.: WO2025/179871
PCT Pub. Date: Sep. 4, 2025

(65) Prior Publication Data
US 2026/0111374 A1 Apr. 23, 2026

(30) Foreign Application Priority Data
Feb. 28, 2024 (CN) .......................... 202410223849.9

(51) Int. Cl.
*G06F 13/00* (2006.01)
*G06F 13/20* (2006.01)
(52) U.S. Cl.
CPC .......... *G06F 13/20* (2013.01); *G06F 2213/40* (2013.01)

(58) Field of Classification Search
None
See application file for complete search history.

(56) References Cited

U.S. PATENT DOCUMENTS 6,396,768 B2 * 5/2002 Ooishi .................... G11C 7/222
365/189.05
2009/0031065 A1 * 1/2009 Travers ................... H04L 1/243
710/110
(Continued)

FOREIGN PATENT DOCUMENTS

CN 101071407 A 11/2007
CN 101944074 A 1/2011
(Continued)

*Primary Examiner* — Henry Tsai
*Assistant Examiner* — Dean Phan
(74) *Attorney, Agent, or Firm* — IPro, PLLC

(57) ABSTRACT

Embodiments of the present application provide a master-slave switching interface structure of a server. The master-slave switching interface structure includes: at least two input/output interfaces and a routing and switching processor. The routing and switching processor includes: a clock buffer module connected to a first clock input source pin; a local clock module connected to a second clock input source pin; a switch module connected to the first clock input source pin, the first clock output pin, and a clock connection pin. The at least two input/output interfaces are connected to the switch module, and one of the at least two input/output interfaces is a target master-slave switching detection interface; and the routing and switching processor is configured for detecting connection status of the target master-slave switching detection interface, and switching a clock transfer direction of the target master-slave switching detection interface based on the connection status.

20 Claims, 2 Drawing Sheets

(56)                    References Cited

U.S. PATENT DOCUMENTS

| | | | |
|---|---|---|---|
| 2011/0029703 A1 | 2/2011 | Huo et al. | |
| 2022/0390979 A1* | 12/2022 | Xu ........................... | G06F 1/12 |
| 2023/0109990 A1 | 4/2023 | Pappu et al. | |

FOREIGN PATENT DOCUMENTS

| | | |
|---|---|---|
| CN | 101989246 A | 3/2011 |
| CN | 103959203 A | 7/2014 |
| CN | 218181513 U | 12/2022 |
| CN | 117472837 A | 1/2024 |
| CN | 117827716 A | 4/2024 |

* cited by examiner

MASTER-SLAVE SWITCHING INTERFACE STRUCTURE OF SERVER, AND APPLICATION APPARATUS THEREOF

CROSS-REFERENCE TO RELATED APPLICATION

This application claims the priority of the Chinese Patent application filed on Feb. 28, 2024 before the CNIPA, China National Intellectual Property Administration with the application number of 202410223849.9, and the title of "MASTER-SLAVE SWITCHING INTERFACE STRUCTURE OF SERVER AND APPLICATION DEVICE THEREOF", which is incorporated herein in its entirety by reference.

FIELD

The present application relates to the field of computer systems and storage technology and more particularly, to a master-slave switching interface structure of a server, a server connection topology system, a distributed server cluster system, an electronic device, and a non-transitory readable storage medium.

BACKGROUND

With the increasing maturity of computer hardware expansion technologies such as Computer Express Link (CXL), a large number of devices such as CXL interfaces are applied to Artificial Intelligence (AI) servers. However, for a single computer, due to limited chassis space, internal equipment capacity, and computing power, it cannot fully meet user demands. When connecting to a server, it needs to manually identify and set the master and slave devices, and determine a direction of interface signal transmission for the devices.

SUMMARY

In view of the above problems, embodiments of the present application are proposed to provide a master-slave switching interface structure of a server, a server connection topology system, a distributed server cluster system, an electronic device, and a non-transitory readable storage medium that overcome or at least partially solve the above problems.

In order to solve the above problems, in a first aspect of the present application, an embodiment of the present application discloses a master-slave switching interface structure of a server;

the master-slave switching interface structure includes: at least two input/output interfaces and a routing and switching processor; the routing and switching processor includes: a first clock input source pin, a second clock input source pin, a first clock output pin, a clock connection pin, a switch module, a clock buffer module and a local clock module;

the clock buffer module is connected to the first clock input source pin;

the local clock module is connected to the second clock input source pin;

the switch module is connected to the first clock input source pin, the first clock output pin, and the clock connection pin;

the at least two input/output interfaces are connected to the switch module, and one of the at least two input/output interfaces is a target master-slave switching detection interface; and the routing and switching processor is configured for detecting connection status of the target master-slave switching detection interface, and switching a clock transfer direction of the target master-slave switching detection interface based on the connection status.

In some embodiments, the routing and switching processor further includes a plurality of general-purpose input/output pins; each of the at least two input/output interfaces includes a first pin and a second pin; the first pin is disconnected from the second pin; the first pin is connected to one of the plurality of general-purpose input/output pins, and the second pin is grounded.

In some embodiments, each of the at least two input/output interfaces further includes: a first pull-up resistor; one end of the first pull-up resistor is connected to a predetermined power supply, another end of the first pull-up resistor is connected to the first pin and the one of the plurality of general-purpose input/output pins.

In some embodiments, further including: cables connected to the at least two input/output interfaces; each of the cables includes: a third pin and a fourth pin that are short-circuited; in response to the cables being connected to the at least two input/output interfaces, the third pin is connected to the first pin, and the fourth pin is connected to the second pin.

In some embodiments, the routing and switching processor is configured for, in response to detecting a high level, determining that the at least two input/output interfaces are connected to other servers of a cascading server, switching the clock transfer direction of the target master-slave switching detection interface to upstream; in response to detecting a low level, switching the clock transfer direction of the target master-slave switching detection interface to downstream.

In some embodiments, the routing and switching processor is configured for performing port scanning on the plurality of general-purpose input/output pins, and determining the connection status of the target master-slave switching detection interface; in response to the connection status being connected, switching the clock transfer direction of the target master-slave switching detection interface to upstream; in response to the connection status being idle, switching the clock transfer direction of the target master-slave switching detection interface to downstream.

In some embodiments, in response to the clock transfer direction of the target master-slave switching detection interface being downstream, the clock buffer module is connected to the clock connection pin through the switch module; in response to the clock transfer direction of the target master-slave switching detection interface being upstream, the local clock module is connected to the clock connection pin through the second clock input source pin, the first clock output pin, and the switch module.

In some embodiments, the switch module is a single-pole double-throw switch device;

a first input terminal of the single-pole double-throw switch device is connected to the first clock input source pin;

a second input terminal of the single-pole double-throw switch device is connected to the first clock output pin; and an output terminal of the single-pole double-throw switch device is connected to the clock connection pin.

In some embodiments, in response to the clock transfer direction of the target master-slave switching detection interface being downstream, the first input terminal of the single-pole double-throw switch device is connected to the output terminal of the single-pole double-throw switch device; in response to the clock transfer direction of the target master-slave switching detection interface being upstream, the second input terminal of the single-pole double-throw switch device is connected to the output terminal of the single-pole double-throw switch device.

In some embodiments, the target master-slave switching detection interface further includes:

a signal receiving pin; wherein in response to the clock transfer direction of the target master-slave switching detection interface being downstream, the switch module is connected to the clock connection pin, and the signal receiving pin is configured for receiving a signal.

In some embodiments, the signal receiving pin is configured for receiving a clock reset signal, and the clock reset signal is used to reset an output signal of the first clock output pin.

In some embodiments, the master-slave switching interface structure is applied to a computer quick-connect device.

In a second aspect of the present application, an embodiment of the present application discloses a server connection topology system, including a plurality of cascading servers, wherein the plurality of cascading servers are deployed with the master-slave switching interface structure as described above, and the plurality of cascading servers are interconnected via their respective master-slave switching interface structures.

In some embodiments, the plurality of cascading servers are connected by a cable, and the cable includes:

a plug, connected to the master-slave switching interface structure;

a second pull-up resistor, connecting a pin of the plug to a predetermined power supply, and configured for placing the pin at a high level.

In some embodiments, in response to the cable connected to the master-slave switching interface structure, the master-slave switching interface structure is in a high-level state; in response to the cable being not connected to the master-slave switching interface structure, the master-slave switching interface structure is in a low-level state.

In some embodiments, the server connection topology system further includes:

a master-slave switching processor, configured for detecting a level state of the master-slave switching interface structure, and setting the clock transfer direction of the master-slave switching interface structure.

In some embodiments, in response to a newly added cascading server existing, a master-slave switching interface structure of the newly added cascading server is connected to the master-slave switching interface structures of other cascading servers by the cable.

In a third aspect of the present application, an embodiment of the present application discloses a distributed server cluster system, including the server connection topology system as described above.

In a fourth aspect of the present application, an embodiment of the present application discloses an electronic device, including a processor, a memory, and a computer program stored on the memory and capable of running on the processor, wherein the computer program, when executed by the processor, implements the master-slave switching interface structure as described above.

In a fifth aspect of the present application, an embodiment of the present application discloses a non-transitory readable storage medium, wherein a computer program is stored on the non-transitory readable storage medium, and the computer program, when executed by a processor, implements the master-slave switching interface structure as described above.

The embodiment of the present application include the following advantages:

The embodiment of the present application deploys a master-slave switching interface structure on a server, and the master-slave switching interface structure includes: at least two input/output interfaces and a routing and switching processor. The routing and switching processor includes: a first clock input source pin, a second clock input source pin, a first clock output pin, a clock connection pin, a switch module, a clock buffer module and a local clock module; the clock buffer module is connected to the first clock input source pin; the local clock module is connected to the second clock input source pin; the switch module is connected to the first clock input source pin, the first clock output pin, and the clock connection pin; the at least two input/output interfaces are connected to the switch module, and one of the at least two input/output interfaces is a target master-slave switching detection interface; and the routing and switching processor is configured for detecting connection status of the target master-slave switching detection interface, and switching a clock transfer direction of the target master-slave switching detection interface based on the connection status. The present application facilitates the connection of multiple servers without changing the software and hardware settings of the computer, and may automatically identify the master and slave devices, switch the clock transfer direction of the target master-slave switching detection interface, thus facilitating device expansion.

DETAILED DESCRIPTION

In order to make the above purposes, features, and advantages of the present application more obvious and understandable, the following will provide further detailed explanations of the present application in conjunction with the accompanying drawings and detailed description.

Figure 1:
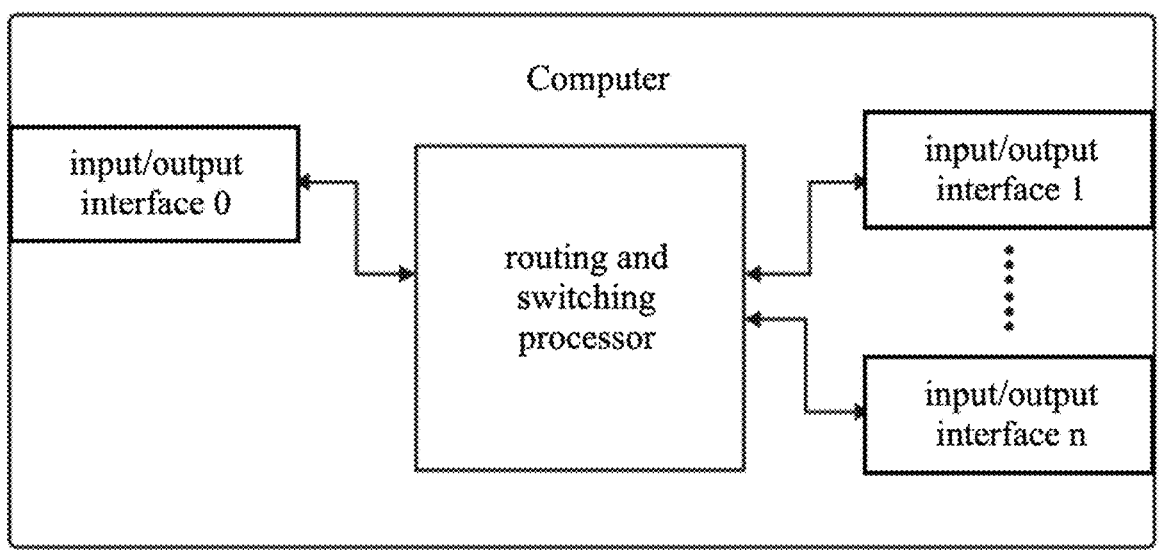
FIG. 1 is a structural system diagram of a master-slave switching interface structure of a server according to an embodiment of the present application.

Referring to FIG. 1, a structural system diagram of a master-slave switching interface structure of a server according to an embodiment of the present application is shown. The master-slave switching interface structure includes: at least two input/output interfaces and a routing and switching processor; the routing and switching processor includes: a first clock input source pin, a second clock input source pin, a first clock output pin, a clock connection pin, a switch module, a clock buffer module and a local clock module;

the clock buffer module is connected to the first clock input source pin;

the local clock module is connected to the second clock input source pin;

the switch module is connected to the first clock input source pin, the first clock output pin, and the clock connection pin;

the at least two input/output interfaces are connected to the switch module, and one of the at least two input/output interfaces is a target master-slave switching detection interface; and the routing and switching processor is configured for detecting connection status of the target master-slave switching detection interface, and switching a clock transfer direction of the target master-slave switching detection interface based on the connection status.

In the embodiment of the present application, the master-slave switching interface structure may be deployed in the server. The master-slave switching interface structure may be applied in high-speed signal connection and expansion scenarios such as CXL, Peripheral Component Interconnect Express (PCIe), etc., and may also be applied in hardware settings corresponding to interfaces of other signal direction automatic switching scenarios. The switch module may be a switching device, including a single-pole double-throw switch. The clock buffer module may be implemented in hardware as a clock buffer, and the local clock module may be a local clock generator or a local clock circuit.

The master-slave switching interface structure includes the at least two input/output interfaces and the routing and switching processor. Among them, the routing and switching processor may include a plurality of pins, with a number of the plurality of pins greater than a number of the input/output interfaces. The input/output interface may be connected to one of the pins in the routing and switching processor, and different input/output interfaces are connected to different pins in the routing and switching processor. One of the at least two input/output interfaces is the target master-slave switching detection interface, the target master-slave switching detection interface may be connected to another server or left unpopulated. When no downstream computer is connected, this interface (i.e., the target master-slave switching detection interface) serves as a normal slave device interface, namely a Slave interface, with a data flow direction being downstream (download), and is used to connect to the slave device. When the downstream computer is connected, this interface serves as the master device interface, namely a Host interface, with the data flow direction being upstream (upload).

The clock buffer module is connected to the first clock input source pin to read the time signal cached by the host, and the local clock module is connected to the second clock input source pin to generate a local time signal. The switch module is connected to the first clock input source pin, the first clock output pin, and the clock connection pin, respectively, and conducts based on different situations.

The routing and switching processor may detect the connection status of the target master-slave switching detection interface, thereby determining whether the server is the master device or the slave device. The routing and switching processor switches the clock transfer direction of the target master-slave switching detection interface based on the connection status, thus, it may be connected to the cascading server.

In some embodiments of the present application, the routing and switching processor further includes a plurality of general-purpose input/output pins; each of the at least two input/output interfaces includes a first pin and a second pin; the first pin is disconnected from the second pin; the first pin is connected to one of the plurality of general-purpose input/output pins, and the second pin is grounded.

In the embodiment of the present application, the routing and switching processor includes the plurality of general-purpose input/output pins, namely GPIO (General Purpose Input/Output) pins. Each input/output interface includes the first pin and the second pin. Among them, the first pin and the second pin are only used to distinguish between two different pins of the input/output interface, and are not limited in function or usage scope. Among them, the first pin and the second pin are disconnected, and the two are not short circuited. The first pin is connected to the general-purpose input/output pin, thereby connecting the input/output interface to the routing and switching processor, and the second pin is grounded.

Furthermore, each of the at least two input/output interfaces further includes: a first pull-up resistor; one end of the first pull-up resistor is connected to a predetermined power supply, another end of the first pull-up resistor is connected to the first pin and the one of the plurality of general-purpose input/output pins.

The input/output interface may be further provided with the first pull-up resistor, one end of the first pull-up resistor is connected to the predetermined power supply and another end of the first pull-up resistor is connected to the first pin and the general-purpose input/output pin, so that when the second pin and the first pin are connected to form a conductive path, the input/output interface is in a high-level state. On the contrary, when the second pin and the first pin are disconnected, the input/output interface is in a low-level state.

Furthermore, the master-slave switching interface structure further includes: cables connected to the at least two input/output interfaces; each of the cables includes: a third pin and a fourth pin that are short-circuited; in response to the cables being connected to the at least two input/output interfaces, the third pin is connected to the first pin, and the fourth pin is connected to the second pin.

Figure 2:
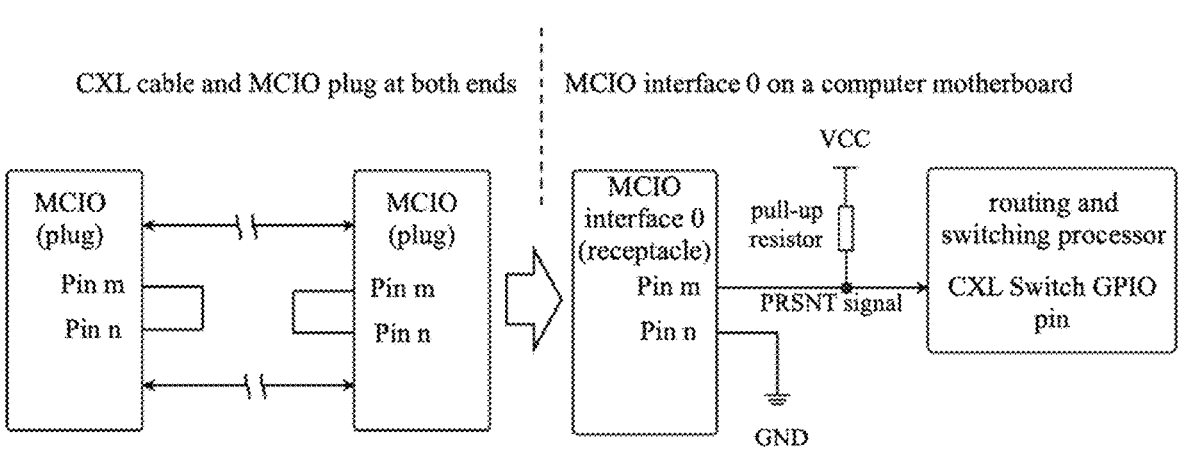
FIG. 2 is a schematic diagram of connection between an input/output interface and a cable according to the present application.

Referring to FIG. 2, the cable includes the third pin and the fourth pin that are short-circuited. When the cable is connected to the input/output interface, the third pin is connected to the first pin, and the fourth pin is connected to the second pin.

Referring to FIG. 2, when there is no CXL cable inserted into the MCIO (Memory Card I/O) interface 0 on a computer motherboard, the PRSNT (Presence Signal) signal is at a high level due to the pull-up resistor. When a CXL cable is inserted, the PRSNT signal becomes low because it passes through a m-th pin of a MCIO receptacle, a m-th pin of a MCIO plug, a n-th pin of the MCIO plug, and a n-th pin of the MCIO receptacle and is ultimately grounded.

Due to the insertion or removal of the CXL cable into/from the receptacle, the high and low levels of the PRSNT signal change and are input to the GPIO pin of the CXL Switch component. Therefore, the CXL Switch component may determine whether a CXL cable is connected by this signal change. When a CXL cable is connected to the MCIO interface 0, this interface becomes an upstream interface to connect to the upstream computer. When there is no CXL cable connected, this interface serves as a downstream interface to connect to other CXL slave devices.

Correspondingly, the routing and switching processor is configured for, in response to detecting a high level, determining that the at least two input/output interfaces are connected to other servers of the cascading servers, switching the clock transfer direction of the target master-slave switching detection interface to upstream; in response to detecting a low level, switching the clock transfer direction of the target master-slave switching detection interface to downstream.

It may detect the level state of the target master-slave switching detection interface directly through existing physical detection methods, thereby quickly and simply detecting the port states, determining the transmission direction of the port, and facilitating the switching of the master and slave devices.

In addition, the routing and switching processor is configured for performing port scanning on the plurality of general-purpose input/output pins, and determining the connection status of the target master-slave switching detection interface; in response to the connection status being connected, switching the clock transfer direction of the target master-slave switching detection interface to upstream; in response to the connection status being idle, switching the clock transfer direction of the target master-slave switching detection interface to downstream.

The connection status of the target master-slave switching detection interface may be detected by using port detection, which may directly determine the connection status from the underlying control process, thus enabling faster and more proactive detection of the connection status of the ports, facilitating the switching of the master and slave devices.

In some embodiments, in response to the clock transfer direction of the target master-slave switching detection interface being downstream, the clock buffer module is connected to the clock connection pin through the switch module; in response to the clock transfer direction of the target master-slave switching detection interface being upstream, the local clock module is connected to the clock connection pin through the second clock input source pin, the first clock output pin, and the switch module.

Furthermore, the switch module is a single-pole double-throw switch device;

a first input terminal of the single-pole double-throw switch device is connected to the first clock input source pin;

a second input terminal of the single-pole double-throw switch device is connected to the first clock output pin; and an output terminal of the single-pole double-throw switch device is connected to the clock connection pin.

In practical applications, the switch module may be the single-pole double-throw switch device, which has the first input terminal, the second input terminal, and the output terminal. The first input terminal is connected to the first clock input source pin, the second input terminal is connected to the first clock output pin, and the output terminal is connected to the clock connection pin. Based on the conductivity situation, the first input terminal may be connected to the output terminal; and the second input terminal may also be connected to the output terminal.

Furthermore, in response to the clock transfer direction of the target master-slave switching detection interface being downstream, the first input terminal of the single-pole double-throw switch device is connected to the output terminal of the single-pole double-throw switch device; in response to the clock transfer direction of the target master-slave switching detection interface being upstream, the second input terminal of the single-pole double-throw switch device is connected to the output terminal of the single-pole double-throw switch device.

It may switch between two signals through one single-pole double-throw switch device, which may reduce the number of the used devices and reduce material costs.

In some embodiments of the present application, the target master-slave switching detection interface further includes:

a signal receiving pin; wherein in response to the clock transfer direction of the target master-slave switching detection interface being downstream, the switch module is connected to the clock connection pin, and the signal receiving pin is configured for receiving a signal.

The target master-slave switching detection interface may include the signal receiving pin, which is connected to the switch module and may be linked with the switch module. When the clock transfer direction of the target master-slave switching detection interface is downstream, the switch module is connected to the clock connection pin, and the signal receiving pin receives the signal.

Furthermore, the signal receiving pin is configured for receiving a clock reset signal, and the clock reset signal is used to reset an output signal of the first clock output pin.

The signal receiving pin receives the clock reset signal, and transmit the clock reset signal to the corresponding pin to reset the output signal of the first clock output pin.

In summary, the clock information transmission part of the target master-slave switching detection interface may be used to transmit clock signals, and the clock reset signal may also be transmitted to achieve multiplexing, thereby further reducing complexity and improving practicality.

Figure 3:
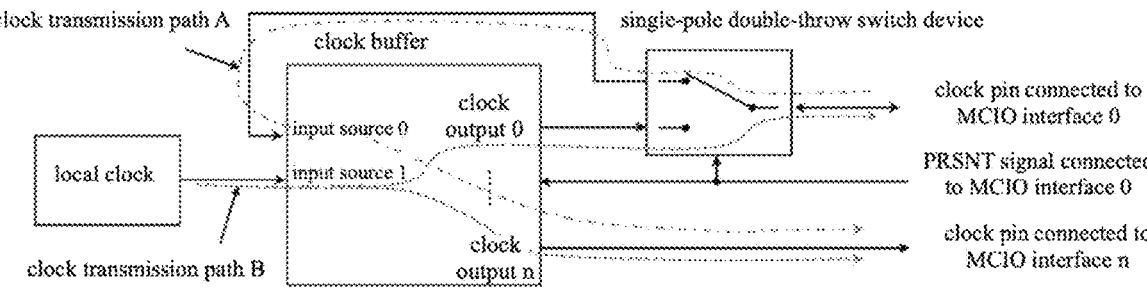
FIG. 3 is a schematic diagram of signal transmission according to the present application.

For this purpose, take FIG. 3 as an example to illustrate:

When there is no CXL cable inserted into the MCIO interface 0, the PRSNT signal (presence signal) is at the high level. At this time, the MCIO interface 0 and other MCIO interfaces serve as downstream interfaces to connect various CXL slave devices. At this time, the reference clock of CXL is sent by the local clock (Generator), and the clock transmission path is a clock transmission path B, the reference clock passes through the data source 1 port of the clock buffer and sent to n+1 interfaces from the MCIO interface 0 to the MCIO interface n while maintaining clock synchronization by the clock buffer. The clock output from the clock output 0 of the clock buffer is connected to the MCIO interface 0 through the P3-P1 path of the SPDT (Single Pole Double Throw) analog switch device.

When the CXL cable is inserted into the MCIO interface 0, the PRSNT signal is the low level. At this time, the MCIO interface 0 serves as the upstream interface to connect to the CXL master device (i.e. upstream computer's MCIO interface n), while other MCIO interfaces still serve as the downstream interfaces to connect to the CXL slave devices. At this time, the MCIO interface 0 receives the clock signal sent by the CXL master device (i.e., the upstream computer's MCIO interface n), and the clock transmission path is a clock transmission path A, the clock signal passes through the P1-P2 path of the SPDT analog switch device, the input source 0 of the clock buffer, and is sent to n other MCIO interfaces except for the MCIO interface 0 (because the P1-P3 path of the SPDT analog switch is disconnected) while maintaining clock synchronization by the clock buffer.

Similarly, the transmission direction of the clock reset signal of the MCIO interface 0 is switched through the same method, that is, when the MCIO interface 0 serves as the downstream interface, the clock reset signal is sent from the local clock to the slave device on the MCIO interface 0;

when the MCIO interface 0 is used as the upstream interface, the reset signal is sent by the CXL master device (i.e. the upstream computer's MCIO interface n) to the MCIO interface 0 and sent to the local computer.

In some embodiments of the present application, the master-slave switching interface structure is applied to a computer quick-connect device.

The master-slave switching interface structure of the present embodiment may be applied to the computer quick-connect device, that is, to achieve identification and switching of the master and slave devices in the computer quick-connect device. In the current context of big data, with the increasing demand for storage, even if the computer quick-connect devices are continuously added in a cluster, it may quickly achieve master-slave switching in the connected links thereof when a new computer quick-connect device is connected, enabling efficient connection of the computer quick-connect device.

The embodiment of the present application deploys the master-slave switching interface structure on any server of the cascading servers, and the master-slave switching interface structure includes: at least two input/output interfaces and a routing and switching processor. The at least two input/output interfaces are connected to the routing and switching processor, and one of the at least two input/output interfaces is the target master-slave switching detection interface; and the routing and switching processor is configured for detecting the connection status of the target master-slave switching detection interface, and switching the clock transfer direction of the target master-slave switching detection interface based on the connection status. The present application facilitates the connection of multiple servers without changing the software and hardware settings of the computer, and may automatically identify the master and slave devices, switch the clock transfer direction of the target master-slave switching detection interface, thus facilitating device expansion.

Figures 4, 5, 6:
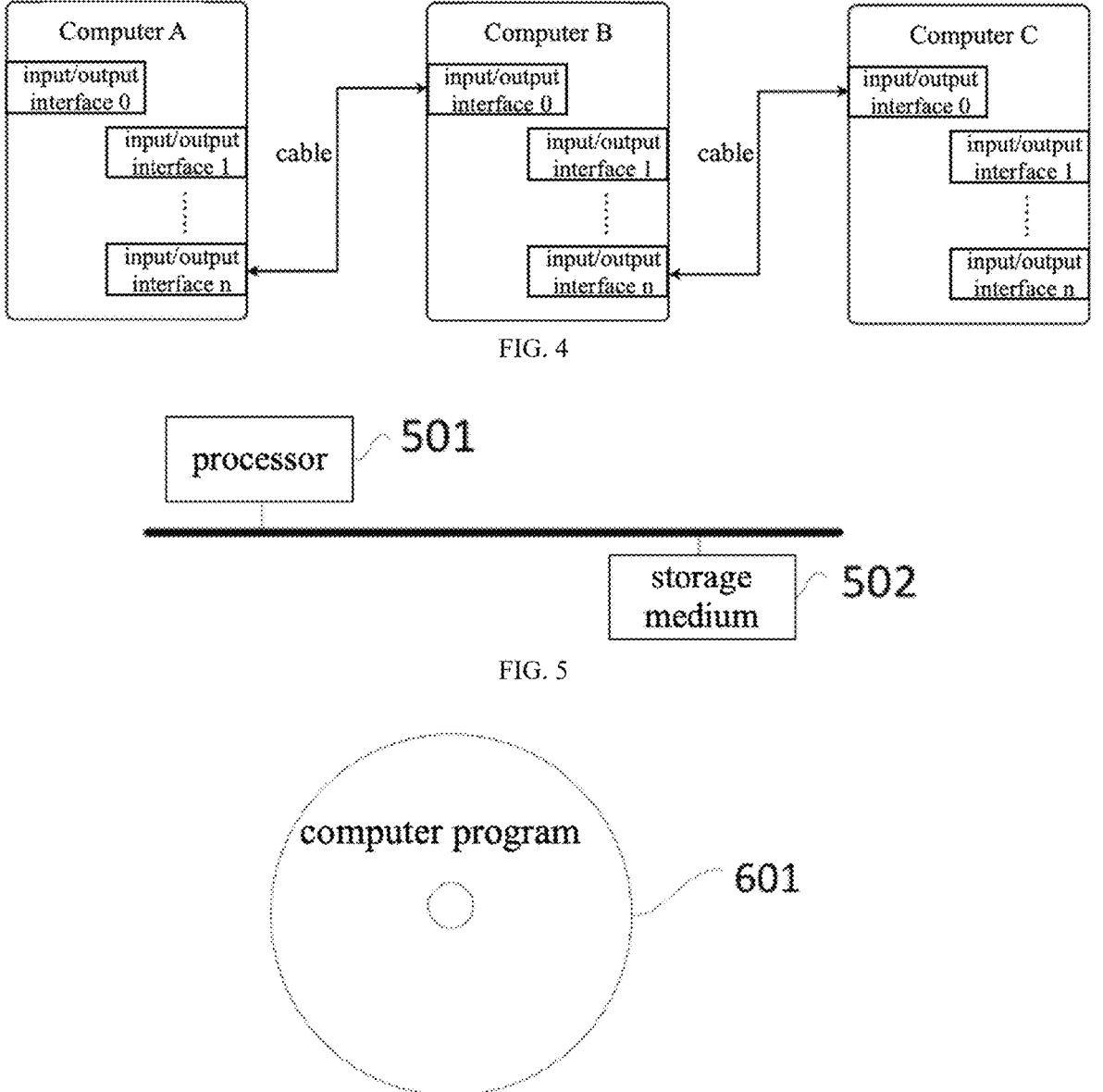
FIG. 4 is a structural system diagram of a server connection topology system according to an embodiment of the present application.
FIG. 5 is a structural block diagram of an electronic device according to an embodiment of the present application.
FIG. 6 is a structural block diagram of a non-transitory readable storage medium according to an embodiment of the present application.

Referring to FIG. 4, a structural system diagram of a server connection topology system according to an embodiment of the present application is shown. The server connection topology system includes a plurality of cascading servers, the plurality of cascading servers are deployed with the master-slave switching interface structure as described above, and the plurality of cascading servers are interconnected via their respective master-slave switching interface structures.

In the embodiment of the present application, the server connection topology system includes the plurality of cascading servers, the plurality of cascading servers are deployed with the master-slave switching interface structure as described above, and the plurality of cascading servers are interconnected via their respective master-slave switching interface structures. As shown in FIG. 4, when the input/output interfaces in the master-slave switching interface structure are unpopulated, the input/output interface 0 to the input/output interface n of each computer all serve as the downstream interfaces to connect to slave devices such as CXL (such as CXL memory expansion cards). When the input/output interface in the master-slave switching interface structure is connected to other servers, the input/output interface 0 of the computer serves as the upstream interface to connect to the upstream computer. For example, in FIG. 4, the input/output interface 0 of the computer B is connected to the input/output interface n of the upstream computer A. At this time, the computer A is the master device and the computer B is the slave device; other input/output interfaces still serve as the downstream interfaces to connect other slave devices.

In some embodiments of the present application, the plurality of cascading servers are connected by a cable, and the cable includes: a plug, connected to the master-slave switching interface structure; and a second pull-up resistor, connecting a pin of the plug to a predetermined power supply, and configured for placing the pin at a high level.

In the embodiment of the present application, the plurality of cascading servers may be connected by the cable. One cable may include the plug and the second pull-up resistor. The plug matches the pin type of the master-slave switching interface structure, and the plug may be connected to the master-slave switching interface structure. The second pull-up resistor may be connected to one of the pins of the plug, and may also be connected to the power supply. That is, the pin of the plug connected to the second pull-up resistor may be placed at the high level, so that when connected to the master-slave switching interface structure, the interface level of the master-slave switching interface structure may be set to the high level.

In some embodiments, in response to the cable connected to the master-slave switching interface structure, the master-slave switching interface structure is in a high-level state; in response to the cable being not connected to the master-slave switching interface structure, the master-slave switching interface structure is in a low-level state.

In addition, when it needs to expand new cascading servers, it may connect the new cascading servers through the cables and the master-slave switching interface structures. When there are newly added cascading servers, the master-slave switching interface structure of the newly added cascading servers is connected to the master-slave switching interface structure of other cascading servers through the cables.

In some optional embodiments of the present application, the server connection topology system further includes:

a master-slave switching processor, configured for detecting a level state of the master-slave switching interface structure, and setting the clock transfer direction of the master-slave switching interface structure.

In the embodiment of the present application, the server connection topology system may also include the master-slave switching processor. The master-slave switching processor may detect the level state of the master-slave switching interface structure, determine whether the cascading server is the master device or the slave device based on high and low levels, and set the clock transfer direction of the master-slave switching interface structure to achieve active identification and master-slave switching.

Furthermore, the master-slave switching interface structure includes: at least two input/output interfaces and a routing and switching processor; the routing and switching processor includes: a first clock input source pin, a second clock input source pin, a first clock output pin, a clock connection pin, a switch module, a clock buffer module and a local clock module;

the clock buffer module is connected to the first clock input source pin;

the local clock module is connected to the second clock input source pin;

the switch module is connected to the first clock input source pin, the first clock output pin, and the clock connection pin;

the at least two input/output interfaces are connected to the switch module, and one of the at least two input/output interfaces is a target master-slave switching detection interface; and the routing and switching processor is configured for detecting connection status of the target master-slave switching detection interface, and switching a clock transfer direction of the target master-slave switching detection interface based on the connection status.

In some embodiments, the routing and switching processor further includes a plurality of general-purpose input/output pins; each of the at least two input/output interfaces includes a first pin and a second pin; the first pin is disconnected from the second pin; the first pin is connected to one of the plurality of general-purpose input/output pins, and the second pin is grounded.

In some embodiments, each of the at least two input/output interfaces further includes: a first pull-up resistor;

one end of the first pull-up resistor is connected to a predetermined power supply, another end of the first pull-up resistor is connected to the first pin and the one of the plurality of general-purpose input/output pins.

In some embodiments, further including: cables connected to the at least two input/output interfaces; each of the cables includes: a third pin and a fourth pin that are short-circuited; in response to the cables being connected to the at least two input/output interfaces, the third pin is connected to the first pin, and the fourth pin is connected to the second pin.

In some embodiments, the routing and switching processor is configured for, in response to detecting a high level, determining that the at least two input/output interfaces are connected to other servers of a cascading server, switching the clock transfer direction of the target master-slave switching detection interface to upstream; in response to detecting a low level, switching the clock transfer direction of the target master-slave switching detection interface to downstream.

In some embodiments, the routing and switching processor is configured for performing port scanning on the plurality of general-purpose input/output pins, and determining the connection status of the target master-slave switching detection interface; in response to the connection status being connected, switching the clock transfer direction of the target master-slave switching detection interface to upstream; in response to the connection status being idle, switching the clock transfer direction of the target master-slave switching detection interface to downstream.

In some embodiments, in response to the clock transfer direction of the target master-slave switching detection interface being downstream, the clock buffer module is connected to the clock connection pin through the switch module; in response to the clock transfer direction of the target master-slave switching detection interface being upstream, the local clock module is connected to the clock connection pin through the second clock input source pin, the first clock output pin, and the switch module.

In some embodiments, the switch module is a single-pole double-throw switch device;

a first input terminal of the single-pole double-throw switch device is connected to the first clock input source pin;

a second input terminal of the single-pole double-throw switch device is connected to the first clock output pin; and an output terminal of the single-pole double-throw switch device is connected to the clock connection pin.

In some embodiments, in response to the clock transfer direction of the target master-slave switching detection interface being downstream, the first input terminal of the single-pole double-throw switch device is connected to the output terminal of the single-pole double-throw switch device; in response to the clock transfer direction of the target master-slave switching detection interface being upstream, the second input terminal of the single-pole double-throw switch device is connected to the output terminal of the single-pole double-throw switch device.

In some embodiments, the target master-slave switching detection interface further includes:

a signal receiving pin; wherein in response to the clock transfer direction of the target master-slave switching detection interface being downstream, the switch module is connected to the clock connection pin, and the signal receiving pin is configured for receiving a signal.

In some embodiments, the signal receiving pin is configured for receiving a clock reset signal, and the clock reset signal is used to reset an output signal of the first clock output pin.

In some embodiments, the master-slave switching interface structure is applied to a computer quick-connect device.

It should be noted that for the sake of simplicity, the embodiments of the present application are described as a series of action combinations. However, those skilled in the art should be aware that the embodiments of the present application are not limited by the order of the described actions, as certain steps may be performed in other orders or simultaneously according to the embodiments of the present application. Secondly, persons skilled in the art should also be aware that the embodiments described in the specification are all preferred embodiments, and the actions involved are not necessarily necessary for the embodiments of the present application.

The present embodiment also discloses a distributed server cluster system, including the server connection topology system as described above.

The server connection topology system includes the plurality of cascading servers, the plurality of cascading servers are deployed with the master-slave switching interface structure as described above, and the plurality of cascading servers are interconnected via their respective master-slave switching interface structures.

The distributed server cluster system may connect multiple servers to a topology system and form an integrated processing for one business. The distributed server cluster system achieves resource sharing, load balancing, high availability, and high performance by distributing tasks and data to multiple nodes of the server connection topology system, and has strong scalability and fault tolerance, thus enabling the distributed server cluster system to handle large-scale data and high concurrency requests.

In some embodiments, the plurality of cascading servers are connected by the cable, and the cable includes:

the plug, connected to the master-slave switching interface structure; and the second pull-up resistor, connecting a pin of the plug to the predetermined power supply, and configured for placing the pin at the high level.

In some embodiments, when the cable is connected to the master-slave switching interface structure, the master-slave switching interface structure is in the high-level state; when the cable is not connected to the master-slave switching interface structure, the master-slave switching interface structure is in the low-level state.

In some embodiments, the server connection topology system further includes:

a master-slave switching processor, configured for detecting the level state of the master-slave switching interface structure, and setting the clock transfer direction of the master-slave switching interface structure.

In some embodiments, when there are newly added cascading servers, the master-slave switching interface structure of the newly added cascading servers is connected to the master-slave switching interface structure of other cascading servers through the cables.

Among them, the master-slave switching interface structure includes: at least two input/output interfaces and a routing and switching processor; the routing and switching processor includes: a first clock input source pin, a second clock input source pin, a first clock output pin, a clock connection pin, a switch module, a clock buffer module and a local clock module;

the clock buffer module is connected to the first clock input source pin;

the local clock module is connected to the second clock input source pin;

the switch module is connected to the first clock input source pin, the first clock output pin, and the clock connection pin;

the at least two input/output interfaces are connected to the switch module, and one of the at least two input/output interfaces is a target master-slave switching detection interface; and the routing and switching processor is configured for detecting connection status of the target master-slave switching detection interface, and switching a clock transfer direction of the target master-slave switching detection interface based on the connection status.

In some embodiments, the routing and switching processor further includes a plurality of general-purpose input/output pins; each of the at least two input/output interfaces includes a first pin and a second pin; the first pin is disconnected from the second pin; the first pin is connected to one of the plurality of general-purpose input/output pins, and the second pin is grounded.

In some embodiments, each of the at least two input/output interfaces further includes: a first pull-up resistor;

one end of the first pull-up resistor is connected to a predetermined power supply, another end of the first pull-up resistor is connected to the first pin and the one of the plurality of general-purpose input/output pins.

In some embodiments, further including: cables connected to the at least two input/output interfaces; each of the cables includes: a third pin and a fourth pin that are short-circuited; in response to the cables being connected to the at least two input/output interfaces, the third pin is connected to the first pin, and the fourth pin is connected to the second pin.

In some embodiments, the routing and switching processor is configured for, in response to detecting a high level, determining that the at least two input/output interfaces are connected to other servers of a cascading server, switching the clock transfer direction of the target master-slave switching detection interface to upstream; in response to detecting a low level, switching the clock transfer direction of the target master-slave switching detection interface to downstream.

In some embodiments, the routing and switching processor is configured for performing port scanning on the plurality of general-purpose input/output pins, and determining the connection status of the target master-slave switching detection interface; in response to the connection status being connected, switching the clock transfer direction of the target master-slave switching detection interface to upstream; in response to the connection status being idle, switching the clock transfer direction of the target master-slave switching detection interface to downstream.

In some embodiments, in response to the clock transfer direction of the target master-slave switching detection interface being downstream, the clock buffer module is connected to the clock connection pin through the switch module; in response to the clock transfer direction of the target master-slave switching detection interface being upstream, the local clock module is connected to the clock connection pin through the second clock input source pin, the first clock output pin, and the switch module.

In some embodiments, the switch module is a single-pole double-throw switch device;

a first input terminal of the single-pole double-throw switch device is connected to the first clock input source pin;

a second input terminal of the single-pole double-throw switch device is connected to the first clock output pin; and an output terminal of the single-pole double-throw switch device is connected to the clock connection pin.

In some embodiments, in response to the clock transfer direction of the target master-slave switching detection interface being downstream, the first input terminal of the single-pole double-throw switch device is connected to the output terminal of the single-pole double-throw switch device; in response to the clock transfer direction of the target master-slave switching detection interface being upstream, the second input terminal of the single-pole double-throw switch device is connected to the output terminal of the single-pole double-throw switch device.

In some embodiments, the target master-slave switching detection interface further includes:

a signal receiving pin; wherein in response to the clock transfer direction of the target master-slave switching detection interface being downstream, the switch module is connected to the clock connection pin, and the signal receiving pin is configured for receiving a signal.

In some embodiments, the signal receiving pin is configured for receiving a clock reset signal, and the clock reset signal is used to reset an output signal of the first clock output pin.

In some embodiments, the master-slave switching interface structure is applied to a computer quick-connect device.

Referring to FIG. 5, the present embodiment also provides an electronic device, including:

a processor 501 and a storage medium 502. The storage medium 502 stores a computer program executable by the processor 501, the computer program, when executed by the processor 501, implements the master-slave switching interface structure as described in any one of the embodiments of the present application.

The master-slave switching interface structure includes: at least two input/output interfaces and a routing and switching processor; the routing and switching processor includes: a first clock input source pin, a second clock input source pin, a first clock output pin, a clock connection pin, a switch module, a clock buffer module and a local clock module;

the clock buffer module is connected to the first clock input source pin;

the local clock module is connected to the second clock input source pin;

the switch module is connected to the first clock input source pin, the first clock output pin, and the clock connection pin;

the at least two input/output interfaces are connected to
the switch module, and one of the at least two input/
output interfaces is a target master-slave switching
detection interface; and the routing and switching processor is configured for
detecting connection status of the target master-slave
switching detection interface, and switching a clock
transfer direction of the target master-slave switching
detection interface based on the connection status.

In some embodiments, the routing and switching processor further includes a plurality of general-purpose input/
output pins; each of the at least two input/output interfaces
includes a first pin and a second pin; the first pin is
disconnected from the second pin; the first pin is connected
to one of the plurality of general-purpose input/output pins,
and the second pin is grounded.

In some embodiments, each of the at least two input/
output interfaces further includes: a first pull-up resistor;

one end of the first pull-up resistor is connected to a
predetermined power supply, another end of the first
pull-up resistor is connected to the first pin and the one
of the plurality of general-purpose input/output pins.

In some embodiments, further including: cables con-
nected to the at least two input/output interfaces; each of the
cables includes: a third pin and a fourth pin that are
short-circuited; in response to the cables being connected to
the at least two input/output interfaces, the third pin is
connected to the first pin, and the fourth pin is connected to
the second pin.

In some embodiments, the routing and switching processor is configured for, in response to detecting a high level,
determining that the at least two input/output interfaces are
connected to other servers of a cascading server, switching
the clock transfer direction of the target master-slave switch-
ing detection interface to upstream; in response to detecting
a low level, switching the clock transfer direction of the
target master-slave switching detection interface to down-
stream.

In some embodiments, the routing and switching proces-
sor is configured for performing port scanning on the
plurality of general-purpose input/output pins, and deter-
mining the connection status of the target master-slave
switching detection interface; in response to the connection
status being connected, switching the clock transfer direc-
tion of the target master-slave switching detection interface
to upstream; in response to the connection status being idle,
switching the clock transfer direction of the target master-
slave switching detection interface to downstream.

In some embodiments, in response to the clock transfer
direction of the target master-slave switching detection
interface being downstream, the clock buffer module is
connected to the clock connection pin through the switch
module; in response to the clock transfer direction of the
target master-slave switching detection interface being
upstream, the local clock module is connected to the clock
connection pin through the second clock input source pin,
the first clock output pin, and the switch module.

In some embodiments, the switch module is a single-pole
double-throw switch device;

a first input terminal of the single-pole double-throw
switch device is connected to the first clock input
source pin;

a second input terminal of the single-pole double-throw
switch device is connected to the first clock output pin;
and an output terminal of the single-pole double-throw switch
device is connected to the clock connection pin.

In some embodiments, in response to the clock transfer
direction of the target master-slave switching detection
interface being downstream, the first input terminal of the
single-pole double-throw switch device is connected to the
output terminal of the single-pole double-throw switch
device; in response to the clock transfer direction of the
target master-slave switching detection interface being
upstream, the second input terminal of the single-pole
double-throw switch device is connected to the output
terminal of the single-pole double-throw switch device.

In some embodiments, the target master-slave switching
detection interface further includes:

a signal receiving pin; wherein in response to the clock
transfer direction of the target master-slave switching
detection interface being downstream, the switch mod-
ule is connected to the clock connection pin, and the
signal receiving pin is configured for receiving a signal.

In some embodiments, the signal receiving pin is config-
ured for receiving a clock reset signal, and the clock reset
signal is used to reset an output signal of the first clock
output pin.

In some embodiments, the master-slave switching inter-
face structure is applied to a computer quick-connect device.

Among them, the memory may include Random Access
Memory (RAM) or non-volatile memory, such as at least
one disk storage. In some embodiments, the memory may
also be at least one storage device located remotely from the
aforementioned processor.

The above-mentioned processor may be a general-pur-
pose processor, including a Central Processing Unit (CPU),
a Network Processor (NP), etc.; it may also be a Digital
Signal Processing (DSP), an Application Specific Integrated
Circuit (ASIC), a Field-Programmable Gate Array (FPGA)
or other programmable logic devices, discrete gates or
transistor logic devices, or discrete hardware components.

Referring to FIG. 6, the present embodiment also provides
a non-transitory readable storage medium 601, a computer
program is stored on the non-transitory readable storage
medium, and the computer program, when executed by a
processor, implements the master-slave switching interface
structure as described in any one of the embodiments of the
present application.

The master-slave switching interface structure includes: at
least two input/output interfaces and a routing and switching
processor; the routing and switching processor includes: a
first clock input source pin, a second clock input source pin,
a first clock output pin, a clock connection pin, a switch
module, a clock buffer module and a local clock module;

the clock buffer module is connected to the first clock
input source pin;

the local clock module is connected to the second clock
input source pin;

the switch module is connected to the first clock input
source pin, the first clock output pin, and the clock
connection pin;

the at least two input/output interfaces are connected to
the switch module, and one of the at least two input/
output interfaces is a target master-slave switching
detection interface; and the routing and switching processor is configured for
detecting connection status of the target master-slave
switching detection interface, and switching a clock
transfer direction of the target master-slave switching
detection interface based on the connection status.

In some embodiments, the routing and switching proces-
sor further includes a plurality of general-purpose input/
output pins; each of the at least two input/output interfaces includes a first pin and a second pin; the first pin is disconnected from the second pin; the first pin is connected to one of the plurality of general-purpose input/output pins, and the second pin is grounded.

In some embodiments, each of the at least two input/output interfaces further includes: a first pull-up resistor; one end of the first pull-up resistor is connected to a predetermined power supply, another end of the first pull-up resistor is connected to the first pin and the one of the plurality of general-purpose input/output pins.

In some embodiments, further including: cables connected to the at least two input/output interfaces; each of the cables includes: a third pin and a fourth pin that are short-circuited; in response to the cables being connected to the at least two input/output interfaces, the third pin is connected to the first pin, and the fourth pin is connected to the second pin.

In some embodiments, the routing and switching processor is configured for, in response to detecting a high level, determining that the at least two input/output interfaces are connected to other servers of a cascading server, switching the clock transfer direction of the target master-slave switching detection interface to upstream; in response to detecting a low level, switching the clock transfer direction of the target master-slave switching detection interface to downstream.

In some embodiments, the routing and switching processor is configured for performing port scanning on the plurality of general-purpose input/output pins, and determining the connection status of the target master-slave switching detection interface; in response to the connection status being connected, switching the clock transfer direction of the target master-slave switching detection interface to upstream; in response to the connection status being idle, switching the clock transfer direction of the target master-slave switching detection interface to downstream.

In some embodiments, in response to the clock transfer direction of the target master-slave switching detection interface being downstream, the clock buffer module is connected to the clock connection pin through the switch module; in response to the clock transfer direction of the target master-slave switching detection interface being upstream, the local clock module is connected to the clock connection pin through the second clock input source pin, the first clock output pin, and the switch module.

In some embodiments, the switch module is a single-pole double-throw switch device; a first input terminal of the single-pole double-throw switch device is connected to the first clock input source pin; a second input terminal of the single-pole double-throw switch device is connected to the first clock output pin; and an output terminal of the single-pole double-throw switch device is connected to the clock connection pin.

In some embodiments, in response to the clock transfer direction of the target master-slave switching detection interface being downstream, the first input terminal of the single-pole double-throw switch device is connected to the output terminal of the single-pole double-throw switch device; in response to the clock transfer direction of the target master-slave switching detection interface being upstream, the second input terminal of the single-pole double-throw switch device is connected to the output terminal of the single-pole double-throw switch device.

In some embodiments, the target master-slave switching detection interface further includes:

a signal receiving pin; wherein in response to the clock transfer direction of the target master-slave switching detection interface being downstream, the switch module is connected to the clock connection pin, and the signal receiving pin is configured for receiving a signal.

In some embodiments, the signal receiving pin is configured for receiving a clock reset signal, and the clock reset signal is used to reset an output signal of the first clock output pin.

In some embodiments, the master-slave switching interface structure is applied to a computer quick-connect device.

The various embodiments in this specification are described in a progressive manner, with each embodiment emphasizing its differences from other embodiments. The same and similar parts between the various embodiments may be referred to each other.

Persons skilled in the art should understand that the embodiments of the present application may be provided as methods, devices, or computer program products. Therefore, the embodiments of the present application may take the form of fully hardware embodiments, fully software embodiments, or embodiments combining software and hardware aspects. Moreover, the embodiments of the present application may take the form of a computer program product implemented on one or more computer usable storage media (including but not limited to disk storage, CD-ROM, optical storage, etc.) containing computer usable program codes.

The embodiments of the present application are described with reference to the flow chart and/or block diagram of the method, terminal device (system), and computer program product according to the embodiments of the present application. It should be understood that each process and/or block in the flow chart and/or block diagram, as well as the combination of processes and/or blocks in the flow chart and/or block diagram, may be implemented by computer program instructions. These computer program instructions may be provided to a processor of a general-purpose computer, specialized computer, embedded processor, or other programmable data processing terminal device to generate a machine, such that the instructions executed by the processor of the computer or other programmable data processing terminal device generate a device for implementing the functions specified in one or more processes in the flow chart and/or one or more boxes in the block diagram.

These computer program instructions may also be stored in computer-readable memory that may guide a computer or other programmable data processing terminal device to operate in a specific manner, such that the instructions stored in the computer-readable memory generate a manufactured product including instruction devices that implement the functions specified in a flow chart or multiple flow charts and/or a block diagram or multiple boxes.

These computer program instructions may also be loaded onto a computer or other programmable data processing terminal device, enabling a series of operational steps to be executed on the computer or other programmable terminal device to generate computer implemented processing. The instructions executed on the computer or other programmable terminal device provide steps for implementing the functions specified in one or more processes in the flow chart and/or one or more boxes in the block diagram.

Although preferred embodiments of the present application have been described, those skilled in the art may make additional changes and modifications to these embodiments once they have knowledge of the basic inventive concept. Therefore, the attached claims are intended to be interpreted as including preferred embodiments and all changes and modifications falling within the scope of the embodiments of the present application.

Finally, it should be noted that in this specification, relational terms such as first and second are only used to distinguish one entity or operation from another, and do not necessarily require or imply any actual relationship or order between these entities or operations. Moreover, the terms "including/comprising", "containing", or any other variation thereof are intended to encompass non-exclusive inclusion, such that a process, method, article, or terminal device that includes a series of elements not only includes those elements, but also includes other elements not explicitly listed, or also includes elements inherent to such process, method, article, or terminal device. Without further limitations, the element limited by the statement "including one." does not exclude the existence of other identical elements in the process, method, item, or terminal device that includes the element.

The above provides a detailed introduction to the master-slave switching interface structure of the server, the server connection topology system, the distributed server cluster system, the electronic device, and the non-transitory readable storage medium provided in the present application. Specific examples are applied in this specification to explain the principles and implementation methods of the present application. The above embodiments are only used to help understand the method and core idea of the present application. Meanwhile, for persons skilled in the art, there may be changes in the specific implementation and application scope based on the ideas of the present application. Therefore, the content of this specification should not be understood as limiting the present application.

The invention claimed is:

1. A master-slave switching interface structure of a server, wherein the master-slave switching interface structure comprises: at least two input/output interfaces and a routing and switching processor; the routing and switching processor comprises: a first clock input source pin, a second clock input source pin, a first clock output pin, a clock connection pin, a switch module, a clock buffer module and a local clock module;

the clock buffer module is connected to the first clock input source pin;

the local clock module is connected to the second clock input source pin;

the switch module is connected to the first clock input source pin, the first clock output pin, and the clock connection pin;

the at least two input/output interfaces are connected to the switch module, and one of the at least two input/output interfaces is a target master-slave switching detection interface; and the routing and switching processor is configured for detecting connection status of the target master-slave switching detection interface, and switching a clock transfer direction of the target master-slave switching detection interface based on the connection status.

2. The master-slave switching interface structure according to claim 1, wherein the routing and switching processor further comprises a plurality of general-purpose input/output pins; each of the at least two input/output interfaces comprises a first pin and a second pin; the first pin is disconnected from the second pin; the first pin is connected to one of the plurality of general-purpose input/output pins, and the second pin is grounded.

3. The master-slave switching interface structure according to claim 2, wherein each of the at least two input/output interfaces further comprises: a first pull-up resistor; and one end of the first pull-up resistor is connected to a predetermined power supply, another end of the first pull-up resistor is connected to the first pin and the one of the plurality of general-purpose input/output pins.

4. The master-slave switching interface structure according to claim 3, further comprising: cables connected to the at least two input/output interfaces; each of the cables comprises: a third pin and a fourth pin that are short-circuited; in response to the cables being connected to the at least two input/output interfaces, the third pin is connected to the first pin, and the fourth pin is connected to the second pin.

5. The master-slave switching interface structure according to claim 4, wherein the routing and switching processor is configured for, in response to detecting a high level, determining that the at least two input/output interfaces are connected to other servers of a cascading server, switching the clock transfer direction of the target master-slave switching detection interface to upstream; in response to detecting a low level, switching the clock transfer direction of the target master-slave switching detection interface to downstream.

6. The master-slave switching interface structure according to claim 2, wherein the routing and switching processor is configured for performing port scanning on the plurality of general-purpose input/output pins, and determining the connection status of the target master-slave switching detection interface; in response to the connection status being connected, switching the clock transfer direction of the target master-slave switching detection interface to upstream; in response to the connection status being idle, switching the clock transfer direction of the target master-slave switching detection interface to downstream.

7. The master-slave switching interface structure according to claim 5, wherein in response to the clock transfer direction of the target master-slave switching detection interface being downstream, the clock buffer module is connected to the clock connection pin through the switch module; in response to the clock transfer direction of the target master-slave switching detection interface being upstream, the local clock module is connected to the clock connection pin through the second clock input source pin, the first clock output pin, and the switch module.

8. The master-slave switching interface structure according to claim 7, wherein the switch module is a single-pole double-throw switch device;

a first input terminal of the single-pole double-throw switch device is connected to the first clock input source pin;

a second input terminal of the single-pole double-throw switch device is connected to the first clock output pin; and an output terminal of the single-pole double-throw switch device is connected to the clock connection pin.

9. The master-slave switching interface structure according to claim 8, wherein in response to the clock transfer direction of the target master-slave switching detection interface being downstream, the first input terminal of the single-pole double-throw switch device is connected to the output terminal of the single-pole double-throw switch device; in response to the clock transfer direction of the target master-slave switching detection interface being upstream, the second input terminal of the single-pole double-throw switch device is connected to the output terminal of the single-pole double-throw switch device.

10. The master-slave switching interface structure according to claim 7, wherein the target master-slave switching detection interface further comprises:

a signal receiving pin; wherein in response to the clock transfer direction of the target master-slave switching detection interface being downstream, the switch module is connected to the clock connection pin, and the signal receiving pin is configured for receiving a signal.

11. The master-slave switching interface structure according to claim 10, wherein the signal receiving pin is configured for receiving a clock reset signal, and the clock reset signal is used to reset an output signal of the first clock output pin.

12. The master-slave switching interface structure according to claim 1, wherein the master-slave switching interface structure is applied to a computer quick-connect device.

13. A server connection topology system, comprising a plurality of cascading servers, wherein the plurality of cascading servers are deployed with the master-slave switching interface structure according to claim 1, and the plurality of cascading servers are interconnected via their respective master-slave switching interface structures.

14. The server connection topology system according to claim 13, wherein the plurality of cascading servers are connected by a cable, and the cable comprises:

a plug, connected to the master-slave switching interface structure; and a second pull-up resistor, connecting a pin of the plug to a predetermined power supply, and configured for placing the pin at a high level.

15. The server connection topology system according to claim 14, wherein in response to the cable connected to the master-slave switching interface structure, the master-slave switching interface structure is in a high-level state; in response to the cable being not connected to the master-slave switching interface structure, the master-slave switching interface structure is in a low-level state.

16. The server connection topology system according to claim 14, further comprising:

a master-slave switching processor, configured for detecting a level state of the master-slave switching interface structure, and setting the clock transfer direction of the master-slave switching interface structure.

17. The server connection topology system according to claim 14, wherein in response to a newly added cascading server existing, a master-slave switching interface structure of the newly added cascading server is connected to the master-slave switching interface structures of other cascading servers by the cable.

18. A distributed server cluster system, comprising the server connection topology system according to claim 13.

19. An electronic device, comprising a processor, a memory, and a computer program stored on the memory and capable of running on the processor, wherein the computer program, when executed by the processor, implements the master-slave switching interface structure according to claim 1.

20. A non-transitory readable storage medium, wherein a computer program is stored on the non-transitory readable storage medium, and the computer program, when executed by a processor, implements the master-slave switching interface structure according to claim 1.

* * * * *